United States Patent [19]

Evans

[11] Patent Number: 5,369,547
[45] Date of Patent: Nov. 29, 1994

[54] CAPACITOR

[75] Inventor: David A. Evans, Seekonk, Mass.

[73] Assignee: The Evans Findings Co., Ltd., East Providence, R.I.

[21] Appl. No.: 35,224

[22] Filed: Mar. 22, 1993

[51] Int. Cl.$^5$ .............................................. H01G 9/05
[52] U.S. Cl. ................................. 361/516; 361/509; 361/522
[58] Field of Search ............... 29/25.03; 361/503, 508, 361/509, 517, 516, 520, 518, 519, 507, 529, 532, 541, 522

[56]  References Cited

U.S. PATENT DOCUMENTS

| | | | |
|---|---|---|---|
| 2,236,270 | 3/1941 | Katzman | 361/506 |
| 3,531,693 | 9/1970 | Buice | 361/516 |
| 3,632,498 | 1/1974 | Beer | 204/290 F |
| 4,184,192 | 1/1980 | Yoshida et al. | 29/25.03 |
| 4,245,275 | 1/1981 | Cannon | 361/516 |
| 4,408,259 | 10/1983 | Muranaka et al. | 361/434 |
| 4,766,522 | 8/1988 | McHardy et al. | 361/501 |
| 4,780,797 | 10/1988 | Libby | 361/509 |
| 4,942,500 | 7/1990 | Libby et al. | 361/516 |
| 5,043,849 | 8/1991 | Libby | 361/516 |
| 5,098,485 | 3/1992 | Evans | 148/272 |
| 5,230,712 | 7/1993 | Matthews | 29/25.03 |

FOREIGN PATENT DOCUMENTS

| | | | |
|---|---|---|---|
| 0078404 | 5/1983 | European Pat. Off. | |
| 5006840 | 1/1993 | Japan | 361/509 |
| 5013282 | 1/1993 | Japan | 361/516 |

OTHER PUBLICATIONS

Raistrick et al, "Transition Metal Oxide Electrochemical Capacitors", Proceedings of Electrochemical Society Symposium of Electroceramics, Hawaii, Oct. 1987.
Raistrick et al, "Electrical Response of Electrochemical Capacitors Based On High Surface Area Ruthenium Oxide Electrodes", Electrochemical Society Proceedings May 1987.
Raistrick, Invited chapter entitled "Electrochemical Capacitors", Jan. 1990, pp. 1–39.
McHardy, "Electrochemical Capacitors", American Institute of Aeronautics and Astronautics, Inc., 1987, pp. 306–308.
Oxley, "High-Rate, Solid-State Electrochemical Capacitors", IEEE 1990, pp. 346–350.
Libby, "Counterelectrode Preparation For an Improved Tantalum Electrolytic Capacitor Meeting The Requirements of MIL-C-39006/26,27", pp. 134–138 1988.

*Primary Examiner*—Bruce A. Reynolds
*Assistant Examiner*—Gregory L. Mills
*Attorney, Agent, or Firm*—Leydig, Voit & Mayer

[57] ABSTRACT

An electrolytic capacitor including a metal container having an inside surface and an outside surface and functioning as a cathode of the capacitor, a porous coating including an oxide of one of ruthenium, iridium, nickel, rhodium, platinum, palladium, and osmium disposed at the inside surface of the container in electrical communication with the container, an anode selected from the group consisting of tantalum, aluminum, niobium, zirconium, and titanium, disposed within and spaced from the porous coating, and an electrolyte within the container in contact with the porous coating and the electrode.

40 Claims, 2 Drawing Sheets

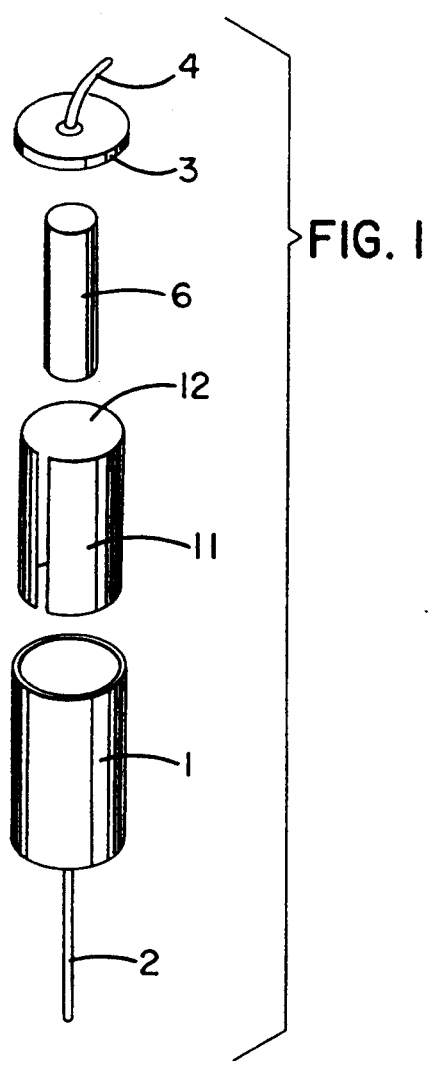
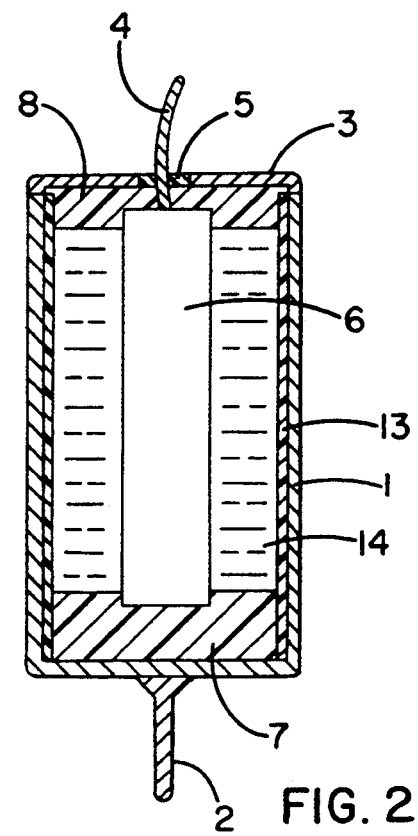
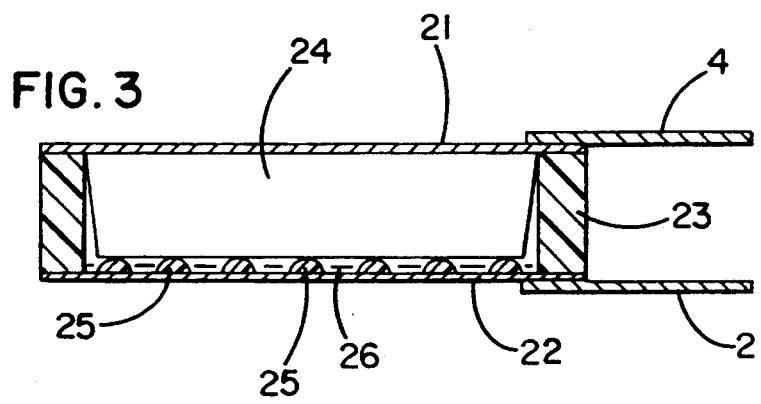

CAPACITOR

FIELD OF THE INVENTION

The present invention concerns improved capacitors and particularly capacitors employing a pseudocapacitor-type cathode and a wet slug-type capacitor anode to achieve improved performance including increased energy storage density.

BACKGROUND OF THE INVENTION

Tantalum wet slug capacitors have long been known in the capacitor arts. An example of the structure of a wet slug tantalum capacitor is described in U.S. Pat. No. 4,780,797. Fundamentally, as described there, the wet slug capacitor includes a tantalum or tantalum-plated container that is the cathode or negative terminal of the electrolytic capacitor. An electrolyte and a porous sintered tantalum anode are disposed within the container. Tantalum forms a native oxide on exposed surfaces that may be increased in thickness by anodic oxidation. In the conventional wet slug capacitor, both the anode and cathode have insulating tantalum oxide coatings that are spaced apart from each other but are both in contact with the electrolyte, typically a sulfuric acid solution. Since sulfuric acid is electrically conductive, a conductor-insulator-conductor structure including metal, oxide coating, and electrolyte is present at both the anode and the cathode. Each of these conductor-insulator-conductor structures is itself a capacitor, i.e., an anode capacitor and a cathode capacitor. The capacitances of these electrode capacitors are to some degree determined by the thickness of the oxide layers formed on the anode and the cathode. Increasing the thickness of the anode oxide layer but not the cathode oxide layer, for example, by anodic oxidation, increases the breakdown voltage that a wet slug capacitor can withstand but reduces the overall capacitance of the capacitor. Typical breakdown voltages for a single capacitor can range from ten to one hundred twenty-five volts.

In the wet slug capacitor, the anode capacitance is effectively electrically connected in series with the cathode capacitance. As is well known, the net capacitance of two capacitors connected in series is smaller than the smaller of the capacitances of the two capacitors. Because the oxide layer at the anode of a wet slug capacitor is usually much thicker than the thickness of the oxide layer at the cathode, the anode capacitance of a wet slug capacitor is smaller than the cathode capacitance. For example, in a typical structure, the anode capacitance may be 3,100 microfarads and the cathode capacitance may be 8,700 microfarads. The resulting net capacitance of that capacitor is about 2,300 microfarads.

Although wet slug capacitors having useful capacitances and breakdown voltages can be readily produced, there is always a desire to increase the capacitance per unit volume of those capacitors, i.e., the energy storage density, without a reduction in the breakdown voltage. One proposed method of increasing the energy storage density of a wet slug capacitor is described in the cited patent. In that patent, a number of metallic films are deposited on the inside of the container of the capacitor. In particular, it is suggested that a film selected from the platinum group of metals, i.e., ruthenium, rhodium, palladium, and platinum, be alloyed with the tantalum of the container in segregated islands where the native oxide has been removed from the tantalum. Various techniques can be employed to deposit the platinum group metal, such as sputtering and electrolytic or electroless plating, followed by a heat treatment at a relatively high temperature, for example, from 925° C. to 1,500° C. Preferably, a platinum group metal layer is subsequently deposited on the islands to form a spongy layer. The platinum group metals apparently improve the energy storage density of capacitors having the structure described in the patent.

In U.S. Pat. No. 4,942,500, a platinum group metal is applied to a capacitor cathode by cladding, i.e., by rolling a very thin layer of the platinum group metal with the tantalum metal. Explosive bonding is also mentioned. In U.S. Pat. No. 5,043,847, electrolytic co-deposition of a base metal and platinum group metal on the inside surface of a wet slug capacitor container is described. Addition of the platinum group metal by these techniques is said to increase the energy storage density.

A different type of electrolytic capacitor, frequently referred to as an electrochemical capacitor, employs so-called pseudocapacitive electrodes. These capacitors generally have metal oxide electrodes including a substrate of titanium or tantalum. Typically, a hydrated chloride of the metal, which may be ruthenium, is dissolved in isopropyl alcohol and sprayed on a heated titanium or tantalum substrate. The heat drives off the solvent, resulting in the deposition of a metal chloride. That chloride is heated to a high temperature in air to convert the metal chloride to an oxide. For example, the metal chloride film may be heated to about 250° C. for approximately one-half hour to completely remove the solvent and to drive off water. Thereafter, in a second elevated temperature step, for example, at approximately 300° C., a high surface area film of the oxide of the metal, for example, ruthenium oxide, is formed on the substrate. The oxide film is highly porous, meaning that it has a very high surface area. An electrochemical capacitor includes such an electrode as the anode and as the cathode, typically with a sulfuric acid solution electrolyte. The electrical charge storage mechanism is not yet fully understood. Electrical charges may be stored on the very large surface areas of the two electrodes, providing the capacitance characteristic. Electrical charges may be stored by a reversible change in the oxidation state of a material in an electrode. No matter what the charge storage mechanism is, it is substantially different from the charge storage mechanism of a wet slug capacitor electrode.

Although electrochemical capacitors can provide much higher energy storage densities than wet slug capacitors, the breakdown voltage of individual cell electrochemical capacitors is very low, typically only about one volt, i.e., essentially the dielectric breakdown voltage of the electrolyte. Even if electrochemical capacitors are connected in series, it is difficult to produce a practical capacitor with a breakdown voltage comparable to the breakdown voltages of wet slug capacitors. Thus, electrochemical capacitors have not found wide usage.

SUMMARY OF THE INVENTION

It is an object of the invention to provide an improved electrolytic capacitor having a practical breakdown voltage and a high energy storage density.

According to one aspect of the invention, an electrolytic capacitor comprises a metal container having an inside surface and an outside surface and functioning as a cathode of the capacitor, a porous coating including an oxide of a metal selected from the group consisting of ruthenium, iridium, nickel, rhodium, platinum, palladium, and osmium disposed at the inside surface of the container in electrical communication with the container, an anode selected from the group consisting of tantalum, aluminum, niobium, zirconium, and titanium disposed within the container and spaced from the porous coating, and an electrolyte within the container in contact with the porous coating and the anode.

According to another aspect of the invention, capacitor comprises a first metal body having opposed first and second surfaces and functioning as a cathode of the capacitor, a porous coating including an oxide of a metal selected from the group consisting of ruthenium, iridium, nickel, rhodium, platinum, palladium, and osmium disposed on the first surface of the first metal body, an anode electrode selected from the group consisting of tantalum, aluminum, niobium, zirconium, and titanium disposed on a second metal body opposite and spaced from the first metal body as the anode of the capacitor, an electrolyte in contact with the porous coating and the anode, and a sealant disposed between and contacting the first and second metal bodies, sealing the electrolyte between the first and second metal bodies.

According to yet another aspect of the invention, a capacitor includes a plurality of electrolytic capacitor cells, each cell including a first metal body having opposed first and second surfaces, a porous coating including an oxide of a metal selected from the group consisting of ruthenium, iridium, nickel, rhodium, platinum, palladium, and osmium disposed on the first surface of the first metal body, an anode electrode selected from the group consisting of tantalum, aluminum, niobium, zirconium, and titanium disposed on the second surface of the first metal body, a spacer disposed between the porous coating and the anode for preventing direct contact between the porous coating and the anode wherein the capacitor cells are disposed in a serial arrangement with the porous coating of one first metal body disposed opposite the anode of the next adjacent first metal body in the serial arrangement with the spacer disposed between, separating, and preventing direct contact between the opposed porous coatings and the anodes in the serial arrangement, a second metal body having first and second opposed sides disposed at one end of the serial arrangement and including a porous coating including an oxide of a metal selected from the group consisting of ruthenium, iridium, nickel, rhodium, platinum, palladium, and osmium disposed on one side of the second metal body and opposite an anode of a first metal body in the serial arrangement, but no anode, and functioning as the cathode of the capacitor, a third metal body having opposed first and second sides disposed at another end of the serial arrangement and including an anode selected from the group consisting of tantalum, aluminum, niobium, zirconium, and titanium disposed on one side of the third metal body and opposite a porous coating of a first metal body in the serial arrangement, but no porous coating, and functioning as the anode of the capacitor, an electrolyte disposed between and contacting the respective opposed porous coatings and anodes in the serial arrangement, and a sealant disposed between and contacting adjacent metal bodies in the serial arrangement, sealing the electrolyte within the capacitor and between adjacent metal bodies.

In the invention, one electrode of an electrolytic capacitor is an wet slug capacitor-type electrode, for example, the anode. The other electrode is an electrochemical-type capacitor electrode employing a porous coating including an oxide of a metal selected from the group consisting of ruthenium, iridium, nickel, rhodium, platinum, palladium, and osmium. For the same capacitance value, the cathode of a capacitor according to the invention is reduced in size compared to a conventional wet slug capacitor electrode. If the volume of the conventional wet slug capacitor for a particular capacitance is maintained, then the anode of a capacitor according to the invention can be increased in size relative to the conventional wet slug capacitor anode, increasing the capacitance and the energy storage density as compared to a conventional wet slug capacitor. In addition, if the capacitance of a conventional wet slug capacitor is maintained, then the volume of a corresponding capacitor according to the invention can be made smaller than the conventional wet slug capacitor, increasing energy storage density. A high breakdown voltage, characteristic of the conventional wet slug capacitor, is obtained in the invention because of the presence of the conventional wet slug capacitor anode while realizing increased energy storage density because of the presence of the pseudocapacitor cathode.

BRIEF DESCRIPTION OF THE DRAWING

FIG. 1 is an exploded view of a capacitor according to an embodiment of the invention;

FIG. 2 is a cross-sectional view of an alternative embodiment of a capacitor according to the invention;

FIG. 3 is a cross-sectional view of a single cell prismatic capacitor according to an embodiment the invention.

DESCRIPTION OF PREFERRED EMBODIMENTS

Figure 4:
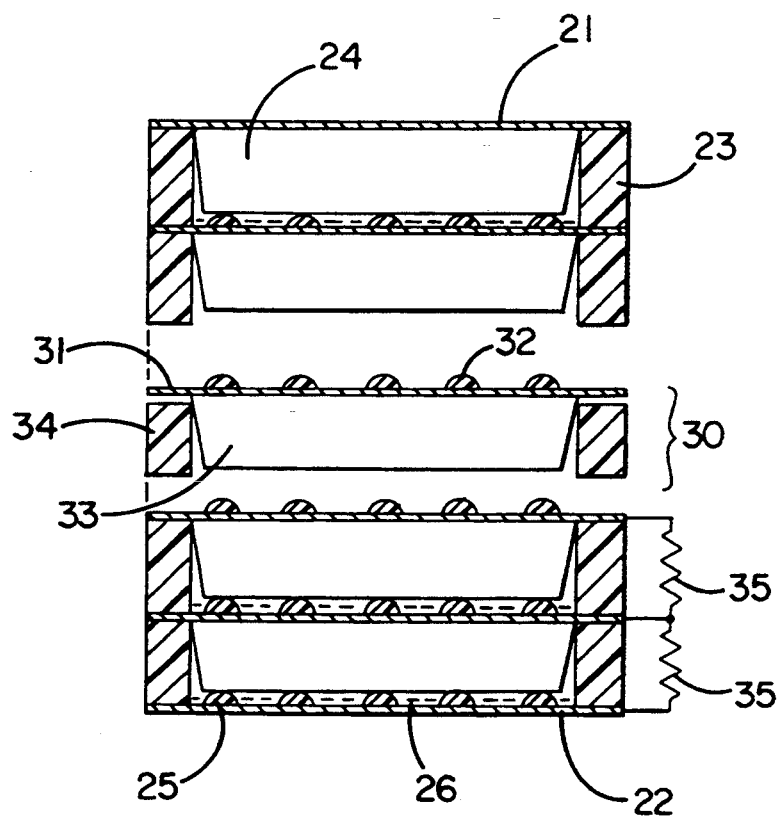
FIG. 4 is a cross-sectional view of a multiple cell prismatic electrolytic capacitor according to an embodiment of the invention.

FIG. 1 is an exploded view of an embodiment of the invention and FIG. 2 is a cross-sectional view of a related but different embodiment of the invention. Like reference numerals are used in those and all other figures to designate the same elements.

In FIG. 1, an electrolytic capacitor according to the invention includes a metal container 1, typically a tantalum container. However, metals other than tantalum may be used in embodiments of the invention. Typically, the container 1 is the cathode of the electrolytic capacitor and includes a lead 2 that is welded to the container. An end seal, a cap 3, includes a second lead 4 that is electrically insulated from the remainder of the cap by a feedthrough 5 seen in FIG. 2. In the assembled capacitor, the cap 3 is bonded to the container 1 by conventional means, for example, by welding. The insulating feedthrough 5 of the lead 4 is like-wise conventional and may include a glass-to-metal seal through which the lead 4 passes. A conventional porous sintered tantalum anode 6 is electrically connected to the lead 4 and disposed within the container 1. Direct contact between the container 1 and the anode 6 is prevented by electrically insulating spacers 7 and 8 within the container 1 that receive the ends of the anode 6. The retaining insulators 7 and 8 are conventional.

In the embodiment of the invention shown in FIG. 1, a metal body 11, such as a metal foil, is disposed within and is in electrical communication with the metal container 1. The communication may be established, for example, by welding the metal body to the inside surface of the metal container 1. The inside surface of the metal body 11 includes a porous coating 12 including a metal oxide. The porous coating preferably includes an oxide of a first metal. The first metal is selected from the transition metals in Group VIII of the Periodic Table of Elements that have at least two stable oxidation states in the electrolyte used in the capacitor. The metal is particularly selected from the group consisting of ruthenium, iridium, nickel, rhodium, platinum, palladium, and osmium. The porous coating may also include an oxide of a second metal selected from the group consisting of tantalum, titanium, and zirconium. The second metal oxide is not believed to be electrically active but increases the surface area of the porous coating and/or extends the mixture used to form the porous coating. The second metal oxide component is not essential in the capacitor cathode. In a preferred embodiment of the invention, the porous coating includes oxides of ruthenium and tantalum.

In the embodiment of the invention shown in FIG. 2, a porous coating 13, i.e., the same as the porous coating 12 of the embodiment of FIG. 1, is formed directly on the surface of the metal container 1. The metal body 11 employed in the embodiment of the invention shown in FIG. 1 is thus eliminated, reducing costs.

In the capacitors of FIGS. 1 and 2, each capacitor includes two electrodes. One of the electrodes, the anode 6, is preferably a conventional sintered porous tantalum anode used in conventional wet slug tantalum capacitors. In addition, the anode may be made of another one of the so-called valve metals, i.e. aluminum, niobium, zirconium, and titanium. The other electrode includes the metal container 1, the metal body 11 with the porous coating 12 or the porous coating 13 on the container 1 and is similar to one of the electrodes used in a pseudocapacitor. As a result of that combination, advantages of a pseudocapacitor and of a wet slug capacitor are achieved without the disadvantages of either of those known capacitor structures. The cathode capacitance is greatly increased over the cathode capacitance of a conventional wet slug capacitor because of the very large surface area and the very small effective "plate separation". (Plate separation refers to modeling of the cathode as a theoretical parallel plate capacitor with two plates having areas A separated from each other by a distance d.) Because of the increased capacitance contributed by the pseudocapacitor cathode for a particular volume, the cathode can be reduced in size, providing space for an anode of increased size, larger than the wet slug capacitor anode of a conventional wet slug capacitor having the same capacitance. Alternatively, for the same volume as a conventional wet slug capacitor, a much larger capacitance can be achieved.

As already described with respect to one example of a conventional wet slug capacitor, a sintered tantalum anode has a capacitance of 3,100 microfarads. A pseudocapacitor cathode replacing the cathode of the conventional tantalum electrolytic capacitor (having a capacitance of 8,700 microfarads) has a capacitance of 0.2 farads. Since, as in the conventional apparatus, these electrode capacitances are electrically connected in series, in the capacitor according to the invention, the over-all capacitance is calculated as 3,050 microfarads, an increase in capacitance of one-third over the conventional wet slug capacitor. Measured capacitances of capacitors in accordance with the invention confirm the accuracy of this calculation.

When a voltage is applied to a capacitor according to the invention, the voltage is divided across the oxide film on the anode and the pseudocapacitor cathode. Because the capacitance of the anode is much smaller than the capacitance of the pseudocapacitor cathode, the voltage applied to the capacitor naturally divides unequally across the electrodes. A large proportion of the applied voltage appears across the anode oxide film and not across the electrolyte. A much smaller proportion of the applied voltage appears across the pseudocapacitor electrode. As a result, a capacitor according to the invention can sustain a much higher voltage, i.e., has a much higher breakdown voltage, than a conventional pseudocapacitor. In other words, increased capacitance as observed in a pseudocapacitor is achieved in the invention without the disadvantage of the low breakdown voltage observed in those known capacitors. As well known in the art, the oxide film on the anode, made of a valve metal, and particularly tantalum or aluminum, can be increased to a desired thickness, increasing the capacitor breakdown voltage, in an electrolytic, anodic oxidation process.

The porous coating, whether formed on a metal body or directly on the inside surface of a metal container of a capacitor according to the invention, is formed using conventional processes. Examples of methods of forming such porous coatings on metal bodies are described in numerous publications. For example, the formation of similar capacitor electrodes is described in U.S. Pat. No. 4,766,522. Electrolysis cell electrodes including similar but very thick coatings are described in some of the examples appearing in U.S. Pat. No. 3,632,498.

In a preferred process, hydrated ruthenium chloride ($RuCl_3.3H_2O$) is dissolved in isopropyl alcohol to form a solution having a concentration of one to three percent. Preferably, an enhancing agent, such as a chloride of tantalum, is added to the solution. A mixture having an atomic ratio of about one ruthenium atom to three tantalum atoms produces a higher capacitance film than do mixtures with different ratios of tantalum to ruthenium atoms. The rate of dissolution of the chlorides in alcohol can be increased by the addition of about 10 milliliters of hydrochloric acid per 100 milliliters of isopropyl alcohol. Titanium, nickel, and zirconium compounds may also be used in place of the tantalum chloride to improve performance of the capacitors according to the invention. While the preferred process employs chlorides because of their solubility, other inorganic and organic salts of the metals can also be employed in the formation of the porous coating.

Whether the substrate on which the porous coating is disposed is a metal body or the inside surface of a metal capacitor container, the substrate is preferably roughened before deposition of the coating to increase the adhesion of the solution subsequently applied to the substrate in forming the coating. The surface may be roughened by chemical treatment, for example, with sulfuric acid, hydrochloric acid, or oxalic acid, or by a mechanical process, such as sand blasting, although mechanical processes are not preferred over chemical treatments. If a native oxide is present on the surface, the method described in U.S. Pat. No. 5,098,485 may be employed to ensure a good electrical contact between the substrate and the porous coating. The tantalum or titanium substrate is then heated to about 85° C. and the solution is applied by spraying. The elevated temperature of the substrate results in rapid evaporation of the alcohol solvent, leaving the formerly dissolved chlorides in place as a film on the substrate. As an alternative to spraying, the substrate may be dipped in the solution. However, spraying a heated substrate results in prompt drying that permits the deposition of relatively thick films quickly by repeated spraying of the substrate.

After the formation of the metallic chloride film, the substrate is heated to a temperature of about 250° C. in air to drive off any remaining solvent and the water contained in the hydrated chloride. In addition, some of the chlorine may be driven off at that time. The heating continues in air for about one hour after which the temperature is increased to approximately 300° C. for a time sufficient to oxidize the metal components of the coating. For example, the oxidizing treatment in air may continue for about two hours. The resulting coating is insoluble in water and sulfuric acid, has pores as small as 50 Angstroms, and has a surface area of up to about 120 square meters per gram.

The completed capacitor includes an electrolyte 14, shown in FIG. 2, disposed between and in contact with both of the electrodes to provide a current path between the electrodes 6 and 11 or 6 and 13. The electrolyte may be any of the conventional electrolytes employed in electrolytic capacitors, most typically a sulfuric acid solution when the anode is tantalum. In other constructions, different electrolytes are used. For example, when the anode is aluminum, an ammonium salt dissolved in glycol or a glycol-like solvent may be employed because sulfuric acid attacks aluminum. When the cathode is nickel, then potassium hydroxide is preferred over sulfuric acid as an electrolyte. As is conventional, the materials of construction of the capacitor that are contacted by the electrolyte are chosen to be impervious or extremely resistant to the effects of the particular electrolyte employed.

The embodiments of the capacitor according to the invention shown in FIGS. 1 and 2 are similar in shape and arrangement to conventional tantalum wet slug capacitors. Other embodiments of the invention resemble the "jelly roll" structure of conventional foil capacitors. In that configuration, the anode slug is replaced by a conventional foil of tantalum or aluminum, or any of the other valve metals, wound in jelly roll fashion as the anode. Some decrease in capacitance is experienced in replacement of the anode slug with the rolled foil. However, an increased capacitance over the conventional jelly roll foil capacitors is achieved in the invention because of the presence of the cathode including the porous coating.

Capacitor cells of still different geometrical configuration according to embodiments of the invention can be easily made. The capacitors cells can be interconnected in series to form a capacitor having a higher breakdown voltage than an individual cell. An example of an embodiment of the invention including a single cell is shown in FIG. 3. A capacitor according to an embodiment of the invention and including a plurality of cells arranged and interconnected serially is shown in FIG. 4.

In FIG. 3, capacitor according to an embodiment of the invention includes opposed metal bodies 21 and 22, preferably thin metal plates or foils. The plates are separated by an insulating sealant 23 that is adhered to both of the plates 21 and 22. FIG. 3 (and FIG. 4) is a sectional view and the capacitor can have any desired shape in plan. For example, if the capacitor has a circular shape in plan view, then preferably the sealant 23 is a unitary, annular body adhered to both plates, sealing and forming a sealed package. If the capacitor has other shapes in plan view, it is still preferred that the sealant 23 be a unitary body following the perimeter of the plates, i.e., the capacitor, defining a closed volume between the two plates 21 and 22. The sealant may extend beyond the plates. The sealant may be a laminate of resin layers that are thermally sealed to each other.

The plates 21 and 22 are preferably tantalum, although other metals, such as titanium, may be employed. A porous tantalum anode 24 or an anode of another valve metal is formed on plate 21 and disposed within the sealed volume defined by the plates 21 and 22 and the sealant 23. The inside surface of the plate 22 is coated with a porous coating including a metal oxide prepared as described above, thereby forming a pseudocapacitor cathode. In order to avoid direct contact between the anode 24 and the porous coating on the inside surface of the plate 22, a spacer is interposed between the anode 24 and the plate 22. Most preferably, the spacer includes a plurality of masses of an electrically insulating material disposed between and contacting the anode 24 and the plate 22. An electrolyte, such as a solution of sulfuric acid, potassium hydroxide, or an ammonium salt, is present between and in contact with the anode 24 and the plate 22. The electrolyte directly contacts the spacer 25 so that the spacer material must be impervious to the electrolyte In the capacitor of FIG. 3, the plate or metal body 22 has a porous coating including a metal oxide formed on one surface in the same manner that the porous coating is formed on metal body 11 or on the inside surface of the container 1 of the embodiments of the invention already described. After the formation of that porous coating, the spacer 25 is deposited on the porous coating. The individual spacing masses may be formed by printing, such as silk screening, while dissolved in a solvent that is subsequently removed, for example, by the application of heat, or by the deposition of individual masses of a melted electrically insulating material. If the electrolyte is sulfuric acid, then the spacer may be made of polyolefin, polyethylene, or polypropylene, for example. Other kinds of spacers can be employed instead of the individual masses illustrated in FIG. 3. For example, a glass fiber paper, plastic fibers, or an ion-permeable material, such as NAFION, may be inserted between the anode 24 and the plate 22 to prevent direct contact of the electrodes. The spacing masses may be located on the anode 24 rather than on the porous coating or may not be fixed to either electrode.

The plate 21, which is preferably the same size and shape as the plate 22, is masked over the area where the sealant 23 will be adhered. Plate 21 may be a thin metal foil, for example, 1 mil in thickness. Tantalum powder held together by a binder, such as stearic acid, if needed, is applied to the plate 21 under pressure. The tantalum powder binder is driven off, for example, by heat, and the powder is sintered in an inert atmosphere to produce a high surface area porous anode. Finally, that anode is anodically oxidized to form tantalum oxide over the surface of the sintered powder to a desired thickness. Similar anodes may be made of aluminum, niobium, zirconium, and titanium.

The plates 21 and 22 are then brought together with the spacer 25 preventing direct contact of the plate 22 and the anode 24. The spacer masses may be about 1 mil high, 5 mils in diameter, and spaced about 50 mils apart in a regular pattern. In order to form a stable assembly, the sealant 23 is then applied at the periphery of the two plates 21 and 22 to form a closed package for retaining the electrolyte. A hot melt polyolefin may be employed as the sealant 23. Subsequently, the sealant can be broken or opened so that the electrolyte 26 can be injected into the package. The interior of the package may be evacuated in advance of injecting the electrolyte. After the electrolyte is in place, the sealant is resealed with additional sealant material. Leads can be easily attached to the plates 21 and 22 before, during, or after assembly of the capacitor.

A capacitor according to an embodiment of the invention and including a plurality of individual capacitor cells 30 interconnected in series is illustrated in FIG. 4. The serial arrangement of the cells 30 is terminated at opposite ends of the arrangement by plates 21 and 22, respectively. With the exception of those two plates, which are identical to the corresponding elements of the capacitor shown in FIG. 3, the remainder of the capacitor units in the capacitor of FIG. 4 are identical cells 30. Since plate 22 on which spacers 25 are disposed and plate 21 on which the anode 24 is formed have already been described, no repetition of the description of those elements is required.

Each cell 30 includes a bipolar metal plate or metal body 31. On one side of the metal body 31, a porous coating including a metal is formed in accordance with the preceding description. For example, a porous ruthenium oxide film containing tantalum oxide is present on one side of the plate 31. Electrically insulating spacing masses 32 are disposed in a pattern on that porous oxide coating. A porous tantalum anode 33, or an anode of a different material, is formed on the opposite side of the plate 31, completing the bipolar element of the cell 30. Generally, the anode 33 is formed first while a mask is present on the opposite side of the plate 31 to prevent the formation of excessive tantalum oxide. After the anode is completed, the mask is removed and the oxide coating is formed on the side of the plate 31 opposite the anode. Thereafter, the spacer masses 32 are formed on the oxide coating. Finally, the sealant 34 is applied to one side of the plate 31, completing the cell 30. The order of the fabrication steps can be changed and the spacing masses can be formed on the anode rather than on the oxide coating provided appropriate changes are made in the cells at the ends of the serial arrangement.

The cells are then assembled by attaching the sealant to the plates of adjacent cells. The sealant may extend beyond individual cells and may merge into a single body along the whole length of the capacitor. The sealant may include laminated resin layers that are heat sealed together beyond the edges of the plates 31. After the serial arrangement of the unit cells is assembled, the end units, i.e., the plate 21 with the attached anode 24 and the plate 22 with the attached spacer masses 25 on the porous coating, are applied to opposite ends of the serial arrangement of identical unit cells to complete the mechanical assembly of the capacitor. Electrolyte is added to each of the cells through openings made in the sealant. The volume occupied by the electrolyte may be evacuated before the electrolyte is introduced. After injection of the electrolyte, the sealant is again closed, finishing the electrolytic capacitor.

When capacitor like the embodiment shown in FIG. 4 includes a number of cells, it is not always possible to produce cells having identical characteristics. Particularly in capacitors according to the invention, where one electrode of each cell is significantly different in one or more of capacitance, resistance, and leakage current from the other electrode of that cell, excessive voltages may be applied to various cells. In order to avoid application of excessive voltages, a resistor, such as the resistors 35 illustrated in FIG. 4, can be connected across the plates of each cell. If resistors are so employed, one such resistor should be connected across each pair of metal plates in the entire serial arrangement rather than the partial connection shown in FIG. 4 which is shown only for illustrative purposes. The resistors should each have essentially the same resistance and provide a current path carrying substantially more current, for example, larger by a factor of ten, than the leakage current that flows through the capacitor. Although the resistors 35 are illustrated as discrete elements in FIG. 4, distributed resistors between adjacent capacitor plates can be provided by employing a sealant with a desired, finite resistivity. Alternatively, an electrically conducting paint can be applied to the sealant in one or more stripes interconnecting the capacitor plates, i.e., electrodes, of the capacitor embodiments of FIGS. 3 and 4.

The invention has been described with respect to certain preferred embodiments. Various additions and modifications within the spirit of the invention will be apparent to those of skill in the relevant arts. Accordingly, the scope of the invention is limited solely by the following claims.

I claim:

1. A capacitor comprising:
   a container having an inside surface;
   a cathode comprising a porous coating including an oxide of a metal selected from the group consisting of ruthenium, iridium, nickel, rhodium, platinum, palladium, and osmium disposed on the inside surface of the container;
   an anode spaced from the porous coating and including a metal selected from the group consisting of tantalum, aluminum, niobium, zirconium, and titanium; and
   an electrolyte in contact with the porous coating and the anode, the container containing the anode and the electrolyte.

2. The capacitor of claim 1 wherein the container comprises a metal and the porous coating is disposed directly on the inside surface of the container.

3. The capacitor of claim 2 wherein the anode is porous sintered tantalum having an oxide coating.

4. The capacitor of claim 3 wherein the electrolyte is a sulfuric acid solution.

5. The capacitor of claim 2 wherein the anode is aluminum coated with an oxide of aluminum.

6. The electrode of claim 5 wherein the electrolyte is an ammonium salt dissolved in glycol.

7. The capacitor of claim 2 wherein the electrolyte is chosen from the group consisting of sulfuric acid, potassium hydroxide, and ammonium salts dissolved in glycol.

8. The capacitor of claim 2 wherein the porous coating includes a mixture of at least one oxide chosen from the group consisting of oxides of ruthenium, iridium, nickel, rhodium, platinum, palladium, and osmium and at least one oxide chosen from the group consisting of oxides of tantalum, titanium, and zirconium.

9. The capacitor of claim 2 wherein the porous coating includes a mixture of oxides of ruthenium and tantalum.

10. The capacitor of claim 2 wherein the porous coating is formed by depositing a salt of the metal of the metal oxide and oxidizing the salt in air to form the porous coating.

11. The capacitor of claim 1 wherein the container include a first metal body on which the porous coating is disposed, a second metal body, and a sealant disposed between and contacting the first and second metal bodies, the anode being disposed on the second metal body.

12. The capacitor of claim 11 wherein the electrolyte is chosen from the group consisting of sulfuric acid, potassium hydroxide, and ammonium salts dissolved in glycol.

13. The capacitor of claim 11 wherein the anode is porous sintered tantalum having an oxide coating.

14. The capacitor of claim 13 wherein the electrolyte is a sulfuric acid solution.

15. The capacitor of claim 11 wherein the porous coating includes a mixture of at least one oxide chosen from the group consisting of oxides of ruthenium, iridium, nickel, rhodium, platinum, palladium, and osmium and at least one oxide chosen from the group consisting of oxides of tantalum, titanium, and zirconium.

16. The capacitor of claim 11 wherein the porous coating includes a mixture of oxides of ruthenium and tantalum.

17. The capacitor of claim 11 including electrically insulating spacing means disposed between the porous coating and the anode for preventing direct contact between the porous coating and the anode.

18. The capacitor of claim 17 wherein the spacing means is a material selected from the group consisting of polyolefin, polyethylene, and polypropylene.

19. The capacitor of claim 17 wherein the spacing means comprises a plurality of spaced apart masses of an electrically insulating material that is stable in the electrolyte, the masses being disposed on the porous coating.

20. The capacitor of claim 11 wherein the sealant is a hot melt polyolefin.

21. The capacitor of claim 11 wherein the porous coating is formed by depositing a salt of the metal of the metal oxide on the first metal body and oxidizing the salt in air to form the porous coating.

22. The capacitor of claim 1 wherein the anode is porous sintered tantalum having an oxide coating.

23. The capacitor of claim 1 wherein the electrolyte is chosen from the group consisting of sulfuric acid, potassium hydroxide, and ammonium salts dissolved in glycol.

24. The capacitor of claim 1 wherein the porous coating includes a mixture of at least one oxide chosen from the group consisting of oxides of ruthenium, iridium, nickel, rhodium, platinum, palladium, and osmium and at least one oxide chosen from the group consisting of oxides of tantalum, titanium, and zirconium.

25. The capacitor of claim 1 wherein the container includes a case and a metal foil within the case, the foil forming the inside surface of the container.

26. The capacitor of claim 25 wherein the case is a metal and the metal foil is electrically connected to the case.

27. The capacitor of claim 26 wherein the metal body is welded to the container.

28. A capacitor comprising:
  a plurality of capacitor cells, each cell including:
    a container comprising a first metal body having opposed inside and Outside surfaces, a second metal body having opposed inside and outside surface and a sealant disposed between and contacting adjacent first and second metal bodies;
    a cathode comprising a porous coating including an oxide of a metal selected from the group consisting of ruthenium, iridium, nickel, rhodium, platinum, palladium, and osmium disposed on the inside surfaces of said first and second metal bodies;
    an anode selected from the group consisting of tantalum, aluminum, niobium, zirconium, and titanium disposed on the outside surfaces of the first and second metal bodies; and
    spacing means disposed between the porous coating and the anode for preventing direct contact between the porous coating and the anode within each capacitor cell,
  wherein the plurality of the capacitor cells are disposed in a serial arrangement with the porous coating on one first metal body being disposed opposite the anode of the next adjacent second metal body in the serial arrangement with the spacing means disposed between, separating, and preventing direct contact between the opposed porous coatings and the anodes in each capacitor cell in the serial arrangement;
  a third metal body having first and second opposed surfaces disposed at a first end of the serial arrangement and having a porous coating including an oxide of a metal selected from the group consisting of ruthenium, iridium, nickel, rhodium, platinum, palladium, and osmium disposed on one side of the third metal body and opposite an anode of a first metal body in the serial arrangement, but no anode, as a cathode terminal of the capacitor;
  a fourth metal body having first and second opposed surfaces and disposed at a second end of the serial arrangement and including an anode selected from the group consisting of tantalum, aluminum, niobium, zirconium, and titanium disposed on one side of the fourth metal body and opposite a porous coating of a second metal body in the serial arrangement, but no porous coating, as an anode of the capacitor;
  an electrolyte disposed between and contacting the opposed porous coatings and anodes in the serial arrangement; and
  a sealant disposed between and contacting the third metal body and a first metal body and between and contacting a second metal body and the fourth metal body in the serial arrangement, sealing the electrolyte within the capacitor cells.

29. The capacitor of claim 28 wherein the electrolyte is chosen from the group consisting of sulfuric acid, potassium hydroxide, and ammonium salts dissolved in glycol.

30. The capacitor of claim 28 wherein the porous coating includes a mixture of at least one oxide chosen from the group consisting of oxides of ruthenium, iridium, nickel, rhodium, platinum, palladium, and osmium and at least one oxide chosen from the group consisting of oxides of tantalum, titanium, and zirconium.

31. The capacitor of claim 28 wherein the spacing means is a material selected from the group consisting of polyolefin, polyethylene, polypropylene, glass fiber paper, and an ion-permeable membrane.

32. The capacitor of claim 28 wherein the spacing means comprises a plurality of spaced apart masses of an electrically insulating material that is stable in the electrolyte.

33. The capacitor of claim 28 wherein the sealant is a hot melt polyolefin.

34. The capacitor of claim 28 including means for electrically interconnecting said first, second, third, and fourth metal bodies in series.

35. The capacitor of claim 34 wherein said means for electrically interconnecting comprises an electrically conductive material disposed within the sealant and contacting the first, second, third, and fourth metal body.

36. The capacitor of claim 34 including an electrically conductive film disposed on the sealant and contacting the first, second, third, and fourth metal bodies.

37. The capacitor of claim 28 wherein each anode is a porous sintered tantalum body coated with an oxide of tantalum.

38. The capacitor of claim 37 wherein the electrolyte is a sulfuric acid solution.

39. The capacitor of claim 28 wherein the porous coating includes a mixture of oxides of ruthenium and tantalum.

40. The capacitor of claim 28 wherein the porous coating is formed by depositing a salt of the metal of the metal oxide on the first and second metal bodies and oxidizing the salt in air to form the porous coating.

* * * * *

UNITED STATES PATENT AND TRADEMARK OFFICE
CERTIFICATE OF CORRECTION

PATENT NO. : 5,369,547
DATED : November 29, 1994
INVENTOR(S) : Evans

It is certified that error appears in the above-indentified patent and that said Letters Patent is hereby corrected as shown below:

Column 12, Line 3, change "inside and Outside" to --first and second--;

Line 4, after "body" insert --spaced from the first metal body and--;

Line 4, change "inside and outside" to --first and second--;

Line 5, change "surface" to --surfaces,--;

Line 6, after "bodies" insert --with the first surface of the second metal body facing the second surface of the first metal body--;

Line 11, change "inside"' to --first--;

Line 13, after "anode" insert --including a metal--;

UNITED STATES PATENT AND TRADEMARK OFFICE
CERTIFICATE OF CORRECTION

PATENT NO. : 5,369,547
DATED : November 29, 1994
INVENTOR(S) : Evans

It is certified that error appears in the above-indentified patent and that said Letters Patent is hereby corrected as shown below:

Line 15, change "outside" to --second--;

Line 23, chanage "with the porous coating on one" to --of alternating--;

Line 23-24, change "metal body being disposed opposite the anode of the next adjacent" to --and--;

Line 24-29, change "body in the serial arrangement with the spacing means disposed between, separating, and preventing direct contact between the opposed porous coatings and the anodes in each capacitor cell in the serial arrangement" to --bodies--;

Line 36, change "first" to --second--;

Line 38, delete "terminal";

Line 41, after anode insert --including a metal--;

UNITED STATES PATENT AND TRADEMARK OFFICE
CERTIFICATE OF CORRECTION

PATENT NO. : 5,369,547
DATED : November 29, 1994
INVENTOR(S) : Evans

It is certified that error appears in the above-indentified patent and that said Letters Patent is hereby corrected as shown below:

Line 45, change "second" to --first--;

Line 49, after "the" insert --respective--;

Line 49-50, change "serial arrangement" to --capacitor--;

Line 52, change "first" to --second--;

Line 53, change "second" to --first--;

Line 54-55, delete ", sealing the electrolyte within the capacitor cells".

Signed and Sealed this

Eighteenth Day of April, 1995

Attest:

BRUCE LEHMAN

*Attesting Officer*

*Commissioner of Patents and Trademarks*

(12) EX PARTE REEXAMINATION CERTIFICATE (7618th)
United States Patent
Evans

(10) Number: US 5,369,547 C1
(45) Certificate Issued: Jul. 20, 2010

(54) CAPACITOR

(75) Inventor: David A. Evans, Seekonk, MA (US)

(73) Assignee: Evans Capacitor Company, Incorporated, East Providence, RI (US)

Reexamination Request:
No. 90/009,193, Jul. 17, 2008

Reexamination Certificate for:
Patent No.: 5,369,547
Issued: Nov. 29, 1994
Appl. No.: 08/035,224
Filed: Mar. 22, 1993

Certificate of Correction issued Apr. 18, 1995.

(51) Int. Cl.
*H01G 9/04* (2006.01)
*H01G 9/00* (2006.01)

(52) U.S. Cl. .................. 361/516; 361/509; 361/522
(58) Field of Classification Search ............... None
See application file for complete search history.

(56) References Cited

U.S. PATENT DOCUMENTS

| | | | |
|---|---|---|---|
| 2,236,270 A | 3/1941 | Katzman | |
| 3,054,029 A | 9/1962 | Wagner et al. | |
| 3,139,568 A | 6/1964 | Ishikawa et al. | |
| 3,337,429 A | 8/1967 | Zind | |
| 3,475,658 A | 10/1969 | Howard et al. | |
| 3,531,693 A | 9/1970 | Buice | |
| 3,564,348 A * | 2/1971 | Cheseldine | 361/528 |
| 3,581,159 A * | 5/1971 | Piper et al. | 361/532 |
| 3,789,274 A * | 1/1974 | Pfister et al. | 361/532 |
| 3,850,764 A | 11/1974 | Herczog et al. | |
| 3,946,289 A * | 3/1976 | Yasuda | 361/527 |
| 4,042,420 A * | 8/1977 | Nishino et al. | 148/272 |
| 4,067,786 A * | 1/1978 | Hilbert et al. | 205/122 |
| 4,164,455 A | 8/1979 | Aronson et al. | |
| 4,184,192 A | 1/1980 | Yoshida et al. | |
| 4,245,275 A | 1/1981 | Cannon | |
| 4,545,108 A | 10/1985 | Adams et al. | |
| 4,780,796 A | 10/1988 | Fukuda et al. | |
| 4,803,596 A | 2/1989 | Hellwig et al. | |
| 4,805,074 A * | 2/1989 | Harakawa et al. | 361/525 |
| 4,942,501 A | 7/1990 | MacFarlane et al. | |
| 5,324,910 A | 6/1994 | Isawa | |
| 5,367,431 A | 11/1994 | Kunishi et al. | |
| 5,450,279 A | 9/1995 | Yoshida et al. | |
| 5,600,535 A | 2/1997 | Jow et al. | |
| 5,621,609 A | 4/1997 | Zheng et al. | |

OTHER PUBLICATIONS

Trainer, "Measurement of the low temperature electrical properties of solid tantalum capacitors," Cryogenics 441, (2001), pp. 285–288.*
Dehbi et al, "High temperature reliability testing of aluminum and tantalum electrolytic capacitors," Microelectronic Reliability, 42, (2002) pp. 835–840.*
"Construction and Characteristics, Solid Aluminum Capacitors With Organic Semiconductor Electrolyte" by Veshay, www.vishay.com, revised Sep. 8, 2004, pp. 292–293.*
Raistrick, Ian, D. et al., "Electrical Response of Electrochemical Capacitors Based on High Surface Area Ruthenium Oxide Electrodes," Electrochemical Society Proceedings (May 1987), 15 pages.
D.A. Evans, *Proceedings of the 14th Capacitor & Resistor Technology Symposium*, Jupiter, Florida, Mar. 1994.

(Continued)

*Primary Examiner*—Alan Diamond

(57) ABSTRACT

An electrolytic capacitor including a metal container having an inside surface and an outside surface and functioning as a cathode of the capacitor, a porous coating including an oxide of one of ruthenium, iridium, nickel, rhodium, platinum, palladium, and osmium disposed at the inside surface of the container in electrical communication with the container, an anode selected from the group consisting of tantalum, aluminum, niobium, zirconium, and titanium, disposed within and spaced from the porous coating, and an electrolyte within the container in contact with the porous coating and the electrode.

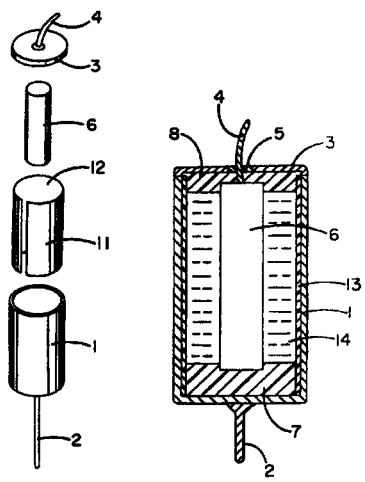

OTHER PUBLICATIONS

Newkirk, A. E, et al.; "Thermal Decomposition of Rhodium, Iridium, and Ruthenium Chlorides"; *J. of Catalysis*, vol. 11, pp. 370–377 (1968).

Trasatti, S. et al.; "Ruthenium dioxide: a new interesting electrode material, Solid state structure and electrochemical behavior", *J. Electroanal. Chem.*, 29, App. 1–5 (1971).

Kemet Electronics Corp.; "What is a Capacitor", pp. 1–12, (1996).

D. Fink et al.; Electronics Engineers' Handbook, ($11^{th}$ Ed.), p. 6–83, (1982).

A. Nishino; "Solid State Electrolytic Capacitors," in Handbook of Solid State Batteries & Capacitors, (M. Munshi, Editor), pp. 627, 631–633 (1995).

Kirk–Othmer Encyclopedia of Chemical Tech., vol. 24, ($4^{th}$ Ed.), p. 670 (1997).

T. Boistuaud et al.; "Solid Tantalum Capacitors for Switching Power Supplies and Converters", J. Electronic Component Conf.–EECC 97, Proceedings of the $3^{th}$ rd ESA Electronic Component Conf. (Apr. 1997).

J. Gill; "Basic Tantalum Capacitor Technology", AVX Ltd. pp. 1–7, (no date).

Hawley's Condensed Chemical Dictionary; (a$4^{th}$ Ed.), pp. 436 and 613, (2001).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 23, 25 and 26 is confirmed.

Claim 1 is cancelled.

Claims 2, 6, 22 and 27 are determined to be patentable as amended.

Claims 3-5, 7 and 10, dependent on an amended claim, are determined to be patentable.

New claims 41 and 42 are added and determined to be patentable.

Claims 8, 9, 11-21, 24, and 28-40 were not reexamined.

2. The capacitor of claim [1] *42* wherein the container comprises a metal and the porous coating is disposed directly on the inside surface of the container.

6. The [electrode] *capacitor* of claim 5 wherein the electrolyte is an ammonium salt dissolved in glycol.

22. The capacitor of [1] *42* wherein the anode is porous sintered tantalum having an oxide coating.

27. The capacitor of claim 26 wherein the metal [body] *foil* is welded to the container.

*41. A capacitor comprising:*
*a container having an inside surface;*
*a cathode comprising a porous coating including an oxide of a metal selected from the group consisting of ruthenium, iridium, nickel, rhodium, platinum, palladium, and osmium disposed on the inside surface of the container;*
*an anode spaced from the porous coating and including a metal selected from the group consisting of tantalum, aluminum, niobium, zirconium, and titanium; and*
*an electrolyte in contact with the porous coating and the anode, wherein*
  *the container contains the anode and the electrolyte, and*
  *the electrolyte is chosen from the group consisting of a solution of sulfuric acid, a solution of potassium hydroxide, and a solution of an ammonium salt.*

*42. A capacitor comprising:*
*a container having an inside surface;*
*a cathode comprising a porous coating including an oxide of a metal selected from the group consisting of ruthenium, iridium, nickel, rhodium, platinum, palladium, and osmium disposed on the inside surface of the container;*
*an anode spaced from the porous coating and including a metal selected from the group consisting of tantalum, aluminum, niobium, zirconium, and titanium; and*
*a liquid electrolyte in contact with the porous coating and the anode, the container containing the anode and the electrolyte.*

\* \* \* \* \*

(12) EX PARTE REEXAMINATION CERTIFICATE (8973rd)
United States Patent
Evans

(10) Number: US 5,369,547 C2
(45) Certificate Issued: Apr. 17, 2012

(54) CAPACITOR

(75) Inventor: David A. Evans, Seekonk, MA (US)

(73) Assignee: Evans Capacitor Company, Incorporated, East Providence, RI (US)

Reexamination Request:
No. 90/011,084, Jul. 7, 2010

Reexamination Certificate for:
Patent No.: 5,369,547
Issued: Nov. 29, 1994
Appl. No.: 08/035,224
Filed: Mar. 22, 1993

Reexamination Certificate C1 5,369,547 issued Jul. 20, 2010

Certificate of Correction issued Apr. 18, 1995.

(51) Int. Cl.
*H01G 9/04* (2006.01)
*H01G 9/00* (2006.01)

(52) U.S. Cl. .................. 361/516; 361/509; 361/522

(58) Field of Classification Search .................. None
See application file for complete search history.

(56) References Cited

To view the complete listing of prior art documents cited during the proceeding for Reexamination Control Number 90/011,084, please refer to the USPTO's public Patent Application Information Retrieval (PAIR) system under the Display References tab.

*Primary Examiner* — Minh T Nguyen

(57) ABSTRACT

An electrolytic capacitor including a metal container having an inside surface and an outside surface and functioning as a cathode of the capacitor, a porous coating including an oxide of one of ruthenium, iridium, nickel, rhodium, platinum, palladium, and osmium disposed at the inside surface of the container in electrical communication with the container, an anode selected from the group consisting of tantalum, aluminum, niobium, zirconium, and titanium, disposed within and spaced from the porous coating, and an electrolyte within the container in contact with the porous coating and the electrode.

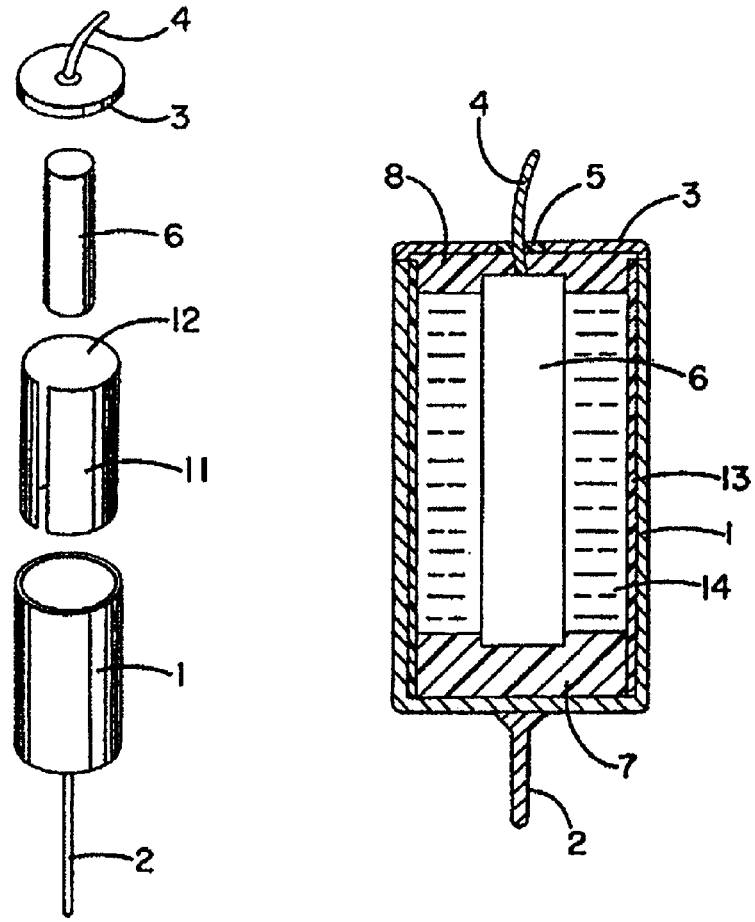

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25-40 is confirmed.

Claim 1 was previously cancelled.

Claim 23 is cancelled.

Claims 11, 15, 22, 24, 41 and 42 are determined to be patentable as amended.

Claims 2-10, 12-14 and 16-21, dependent on an amended claim, are determined to be patentable.

New claim 43 is added and determined to be patentable.

11. The capacitor of claim [1] *42* wherein the container [include] *includes* a first metal body on which the porous coating is disposed, a second metal body, and a sealant disposed between and contacting the first and second metal bodies, the anode being disposed on the second metal body.

15. The capacitor of claim 11 wherein the porous coating includes a mixture of at least one oxide chosen from the group consisting of oxides of ruthenium, iridium, [nickel,] rhodium, platinum, palladium, and osmium and at least one oxide chosen from the goup consisting of oxides of tantalum, titanium, and zirconium.

22. The capacitor of *claim* 42 wherein the anode is porous sintered tantalum having an oxide coating.

24. The capacitor of claim [1] *42* wherein the porous coating includes a mixture of at least one oxide chosen from the group consisting of oxides of ruthenium, iridium, [nickel,] rhodium, platinum, palladium, and osmium and at least one oxide chosen from the goup consisting of oxides of tantalum, titanium, and zirconium.

41. A capacitor comprising:
a container having an inside surface;
a *pseudocapacitor* cathode comprising a porous coating including an oxide of a metal selected from the group consisting of ruthenium, iridium, [nickel,] rhodium, platinum, palladium, and osmium disposed on the inside surface of the container;
an anode spaced from the porous coating and including a metal selected from the group consisting of tantalum, aluminum, niobium, zirconium, and titanium; and
an electrolyte in contact with the porous coating and the anode, wherein
the container contains the anode and the electrolyte, and
the electrolyte is chosen from the group consisting of a solution of sulfuric acid, a solution of potassium hydroxide, and a solution of an ammonium salt.

42. A capacitor comprising:
a container having an inside surface;
a *pseudocapacitor* cathode comprising a porous coating including an oxide of a metal selected from the group consisting of ruthenium, iridium, [nickel,] rhodium, platinum, palladium, and osmium disposed on the inside surface of the container;
an anode spaced from the porous coating and including a metal selected from the group consisting of tantalum, aluminum, niobium, zirconium, and titanium; and
a liquid electrolyte in contact with the porous coating and the anode, the container containing the anode and the electrolyte.

*43. The capacitor of claim 41 wherein the porous coating includes a mixture of at least one oxide chosen from the group consisting of oxides of ruthenium, iridium, rhodium, platinum, palladium, and osmium and at least one oxide chosen from the group consisting of oxides of tantalum, titanium, and zirconium.*

* * * * *